US007487942B2

(12) United States Patent
Krohmer

(10) Patent No.: US 7,487,942 B2
(45) Date of Patent: Feb. 10, 2009

(54) PIPE CLAMP

(75) Inventor: Steven D. Krohmer, Coon Rapids, MN (US)

(73) Assignee: Rockler Companies, Inc., Medina, MN (US)

( * ) Notice: Subject to any disclaimer, the term of this patent is extended or adjusted under 35 U.S.C. 154(b) by 0 days.

(21) Appl. No.: 10/654,721

(22) Filed: Sep. 3, 2003

(65) Prior Publication Data

US 2004/0041061 A1 Mar. 4, 2004

Related U.S. Application Data

(60) Provisional application No. 60/408,115, filed on Sep. 4, 2002.

(51) Int. Cl.
*A47B 96/06* (2006.01)
*B23Q 3/02* (2006.01)

(52) U.S. Cl. .............................. 248/230.09; 248/230.3; 269/97; 269/147; 269/283

(58) Field of Classification Search .............. 248/230.1, 248/230.3, 230.9, 127.1; 269/101, 41, 282, 269/283, 168, 97, 87.1, 147, 166, 37, 43, 269/45, 141, 95, 296
See application file for complete search history.

(56) References Cited

U.S. PATENT DOCUMENTS 1,450,940 A * 4/1923 Cobb ........................ 269/147
4,339,113 A * 7/1982 Vosper ........................ 254/13
4,341,375 A * 7/1982 Romanin ..................... 269/43
4,386,767 A 6/1983 Dyckes et al.
4,395,030 A * 7/1983 Eskuchen ................... 269/181
4,415,149 A * 11/1983 Rees ........................... 269/88
4,498,662 A * 2/1985 Halter ........................ 269/101
4,509,731 A * 4/1985 Schaal et al. .................. 269/78
4,583,724 A * 4/1986 Huang ......................... 269/88
4,619,446 A * 10/1986 Yang ........................... 269/88
5,002,264 A * 3/1991 Nimtz .......................... 269/41
5,064,178 A * 11/1991 Nimtz .......................... 269/41
5,330,216 A * 7/1994 Schnell ........................ 269/45
6,039,313 A * 3/2000 Baculy ....................... 269/168
6,092,797 A * 7/2000 You ........................... 269/181
6,338,478 B2 * 1/2002 Baculy ....................... 269/166
6,685,176 B2 * 2/2004 Wirth et al. .................... 269/6
7,128,313 B1 * 10/2006 Pliley .......................... 269/95

* cited by examiner

*Primary Examiner*—Amy J. Sterling
*Assistant Examiner*—Tan Le
(74) *Attorney, Agent, or Firm*—Gerald E. Helget; Nelson R. Capes; Briggs and Morgan, P.A.

(57) ABSTRACT

A pipe clamp for clamping objects has wide, stable feet that prevent the clamp from tipping over. The feet are of such a height that the clamp handle can be rotated by the user without interference from the bench on which the pipe clamp rests. The clamping faces have holes drilled through them to allow jigs or cauls to be attached to the clamping faces to clamp unusually shaped objects. The clamp also has a hook on the foot for convenient hanging of the clamp for storage.

18 Claims, 3 Drawing Sheets

PIPE CLAMP

This application claims priority to provisional application Ser. No. 60/408,115, filed Sep. 4, 2002, entitled PIPE CLAMP.

BACKGROUND OF THE INVENTION

The new pipe clamp of the present invention solves two common problems associated with pipe clamps.

Common Problem #1. All pipe clamps on the market are designed with a narrow "foot" This is an effective design for molding the part, but is ineffective from a user point of view. The problem is that it is inherently top heavy and unstable, causing the clamp to tip over with little effort. This is a problem during use when the user is positioning the pieces of wood that are to be glued and clamped. Typically, two or more pipe clamps would be used to edge glue several pieces of wood together. The user applies glue to the edge of the pieces and positions them on the pipe clamps. Before the clamps are tightened, the pieces are typically adjusted side to side so the ends line up, and/or so the grain patterns are aligned correctly. As the pieces are adjusted, the pipe clamps typically fall over in a domino effect, requiring the pieces to be removed and the clamps to be re-set on their feet.

There is a need for a pipe clamp with a wider foot that eliminates the tendency of the top heavy clamp from tipping over. The new wide foot should also be relieved in the center so that it rests on two pads at the end of the foot, allowing it to provide a stable base even on uneven surfaces.

Common Problem #2. Because the foot on a standard pipe clamp is short—it typically raises the pipe ¾"-⅞" above the bench top. This low clearance is a problem because it only allows a ⅜"-½" clearance between the handle and the bench top. This is not enough clearance to effectively grip the handle during use. To compensate for this, the user typically positions the pipe clamp on the edge of the bench so the handle is overhanging the top. This allows clearance for the handle, and makes the pipe clamp usable.

There is a need for a pipe clamp with a taller foot.

There is also a need for a pipe clamp with a mechanism for attaching clamping cauls and special fixtures to the clamp for special clamping applications.

There is also a need for a hook for hanging the pipe clamp on a shelf or rack without the need to tighten the clamp against the fixture.

SUMMARY OF THE INVENTION

A pipe clamp for clamping objects has wide, stable feet that prevent the clamp from tipping over. The feet are of such a height that the clamp handle can be rotated by the user without interference from the bench on which the pipe clamp rests. The clamping faces have holes drilled through them to allow jigs or cauls to be attached to the clamping faces to clamp unusually shaped objects. The clamp also has a hook on the foot for convenient hanging of the clamp for storage.

A principle object and advantage of the present invention is that it has a taller foot that raises the pipe 1½" above the bench. This also increases the clearance between the handle and the bench top to 1¼", enough to effectively use the handle while the clamp is positioned anywhere on the bench top.

A second principle object and advantage of the present invention is that it has a wider foot that eliminates the tendency of the top heavy clamp from tipping over. The new wide foot is also relieved in the center so that it rests on two pads at the end of the foot, allowing it to provide a stable base even on uneven surfaces.

Another principle object and advantage of the present invention is that it has holes drilled in both the front and back clamping faces. This facilitates adding clamping cauls and specialty fixtures to the clamp for special clamping applications. Cauls are used to spread the clamping force over a wider surface than simply the 1⅞" wide clamp face. Jigs are used to clamp specific projects that may have unusual shapes that are difficult, if not impossible to clamp with a standard pipe clamp. Examples would be clamping concave or convex shapes.

Another principle object and advantage of the present invention is that it has a "hook" on the foot of the head section. This "hook" hangs over the shelf or rack, and prevents the clamp from falling off. It also eliminates having to move the tail section or tightening the clamp on the shelf. This allows quick mounting and dismounting, and provides a secure method store the pipe clamp.

DETAILED DESCRIPTION OF THE PREFERRED EMBODIMENT

Figure 1:
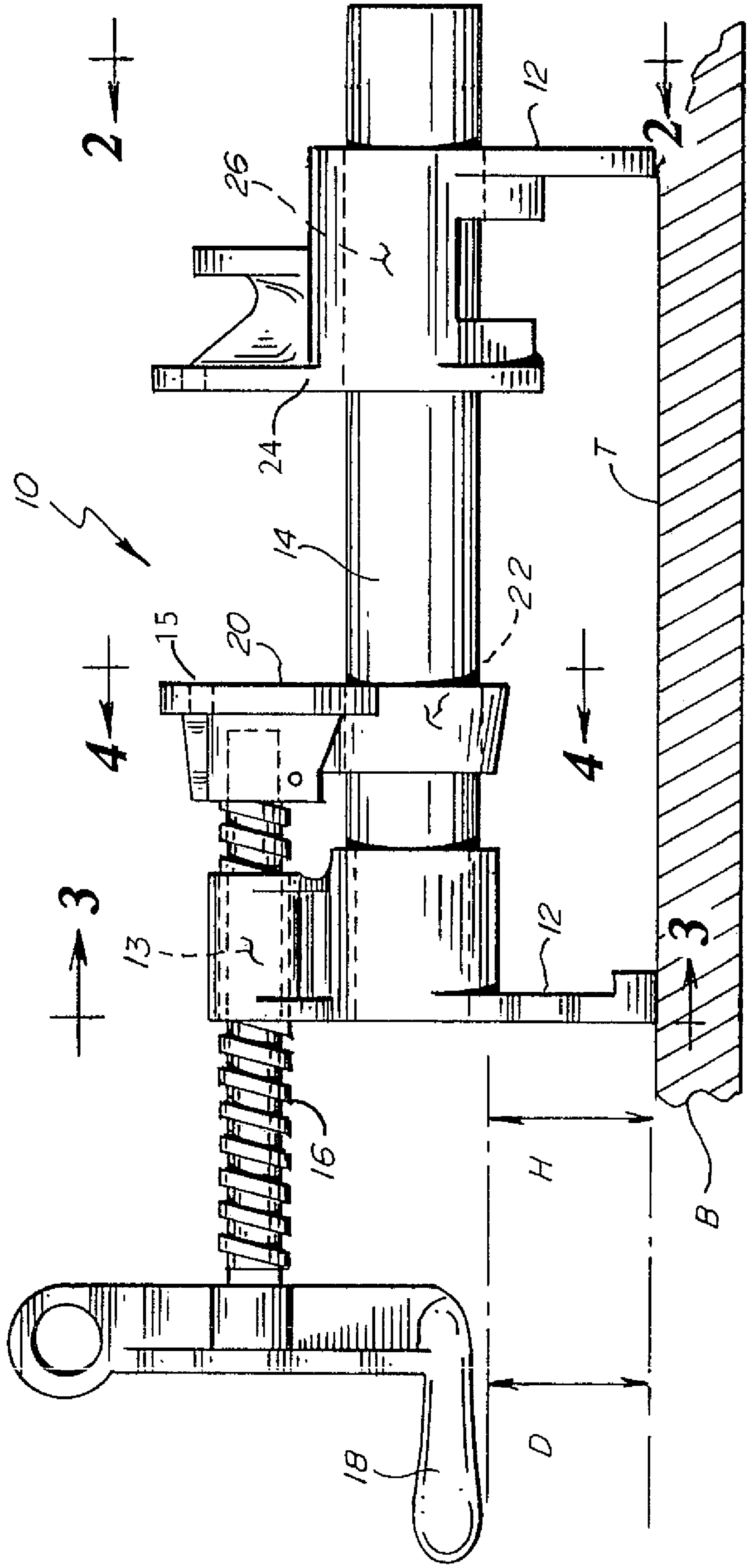
FIG. 1 is side elevational view of the pipe clamp of the present invention.

The pipe clamp of the present invention is generally shown in the Figures as reference numeral 10.

As best seen in FIG. 1, the pipe clamp 10 comprises a pair of supports 12 supporting an elongated body 14. The apparatus 10 further comprises a clamping member 15. A screw 16 is threadably engaged in a threaded aperture 13 and terminates in the clamping member 15. A handle 18 is attached to the screw 16. The handle is used to drive the screw 16 into and out of the threaded aperture 13. A second aperture 22 engages the elongated body 14.

The clamping member 15 terminates in a first clamping face 20.

The other support 12 has a second clamping face 24, which has a third aperture 26 therethrough engaging the elongate body 14.

Figure 3:
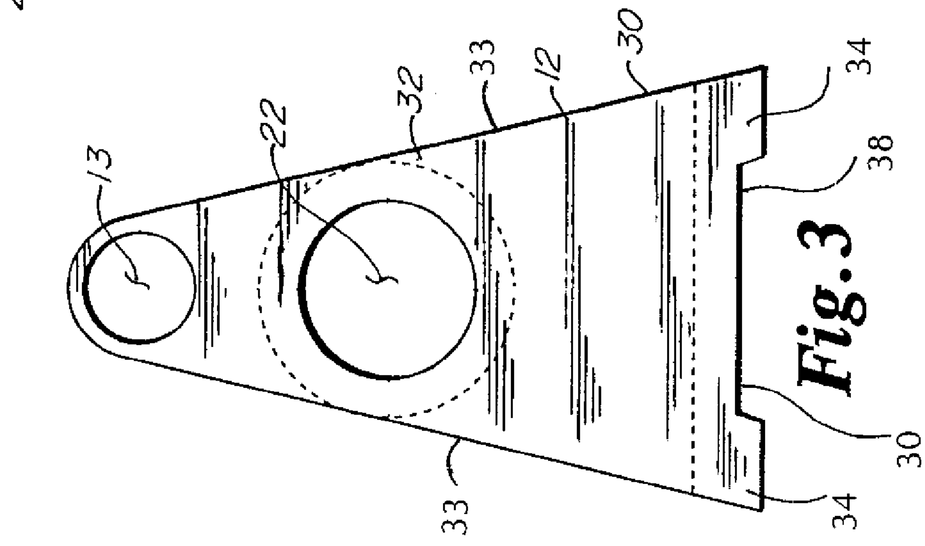
FIG. 3 is a second end elevational view of the pipe clamp of the present invention, taken at approximately the lines 3 of FIG. 1.
Figure 2:
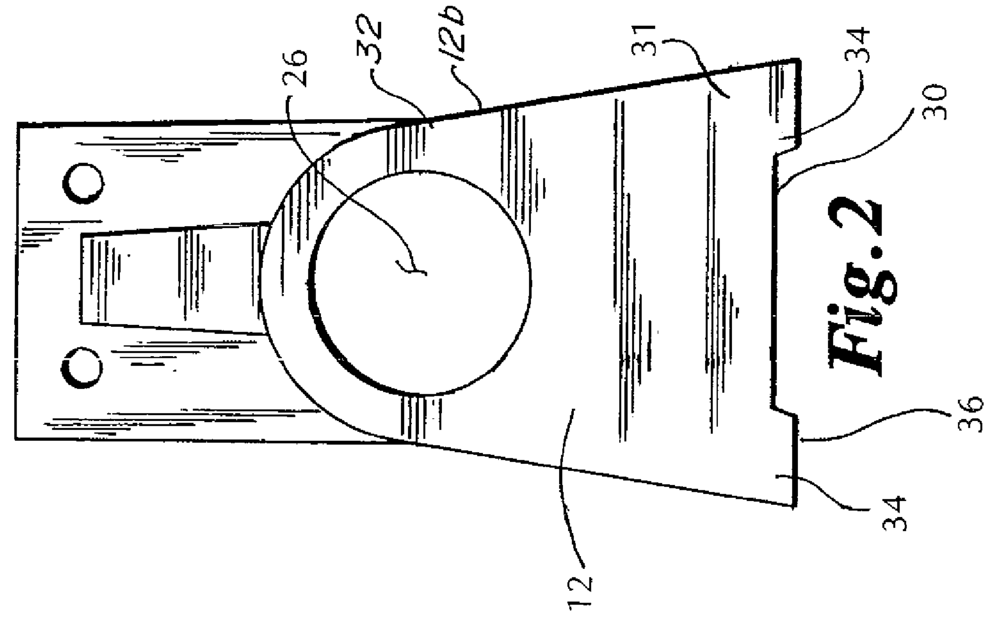
FIG. 2 is an end elevational view of the pipe clamp of the present invention, taken at approximately the lines 2 of FIG. 1.

As best seen in FIGS. 2 and 3, the supports 12, have a broad base 30. The base 30 has a first portion 31 which is substantially broader than the second portion 32 enclosing the apertures 22, 26. This results in the pipe clamp 10 being very stable and having little tendency to tip over. For best stability, one of the supports 12 has sides 33 smoothly and continuously tapering from the base 30 towards the elongated body.

Preferably, that support 12 is substantially triangular in shape, and is most preferably an isosceles triangle with the base 30 forming the unequal side.

The base 30 may have pads 34 with bottom surface 36 separated by a cut-out 38. The pads 34 provide stability on an uneven surface. The bottom surface 36 of the base 30 may rest in use upon a table or bench B having a top surface T. The height H of the third aperture 26 above the bottom surface 36 of the base 30 is such that when the handle is positioned toward the pads 34, as shown in FIG. 1, the handle 18 is raised a clearance distance D off the top surface T of the bench B, providing room for a user to grip the handle 18 without being blocked by the bench B. Typically, the height H is about 1½" and the clearance distance D is at least about 1¼".

Figure 4:
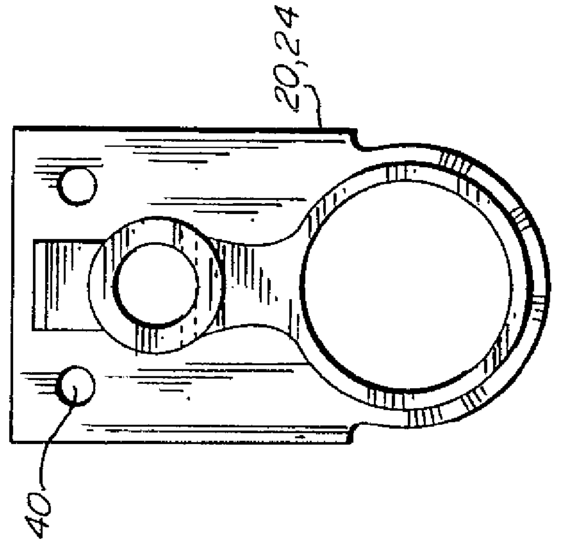
FIG. 4 is a cross section taken at approximately the lines 4 of FIG. 1.
Figure 6:
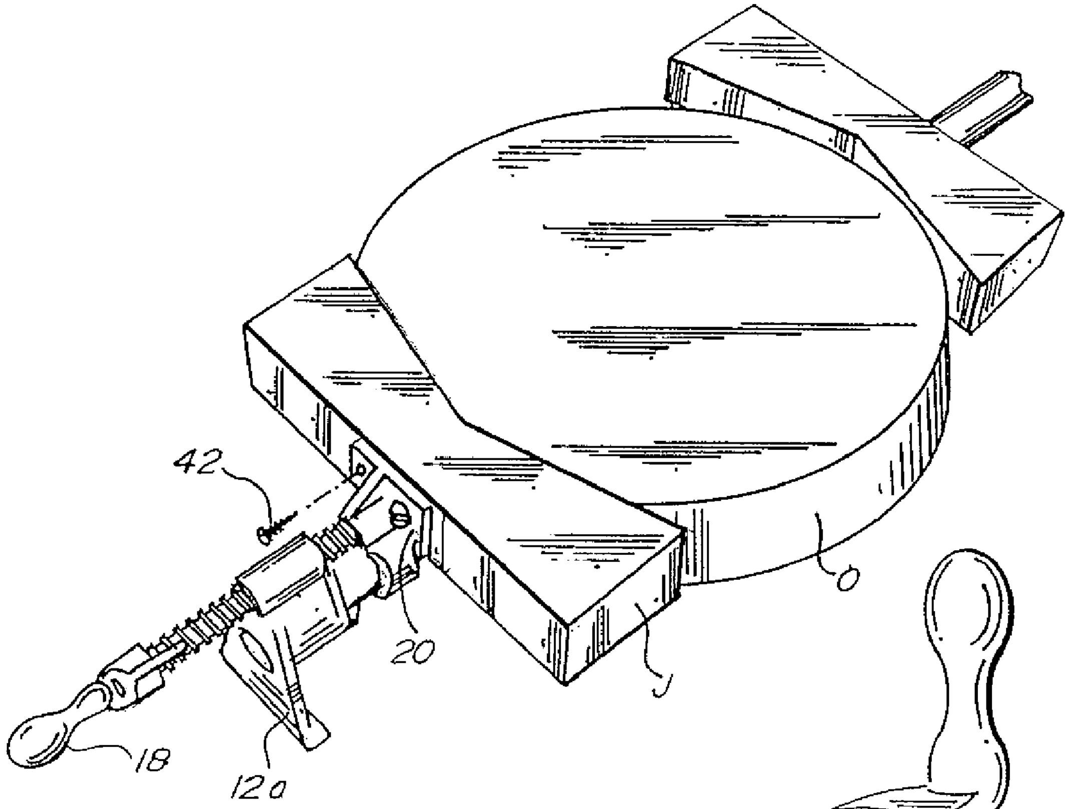
FIG. 6 is a perspective view of the pipe clamp of the present invention, showing the use of holes in the clamping faces to secure a jig used to hold a round object.

As best seen in FIG. 4, each of the clamping faces 20, 24 has fourth apertures 40 therethrough. These apertures 40 can be used to secure a jig J or caul to the clamping faces, using screws or bolts 42, as best seen in FIG. 6. The jig J or caul can be used to clamp an unusually shaped object O, that could not otherwise be clamped by the clamping faces.

Figure 5:
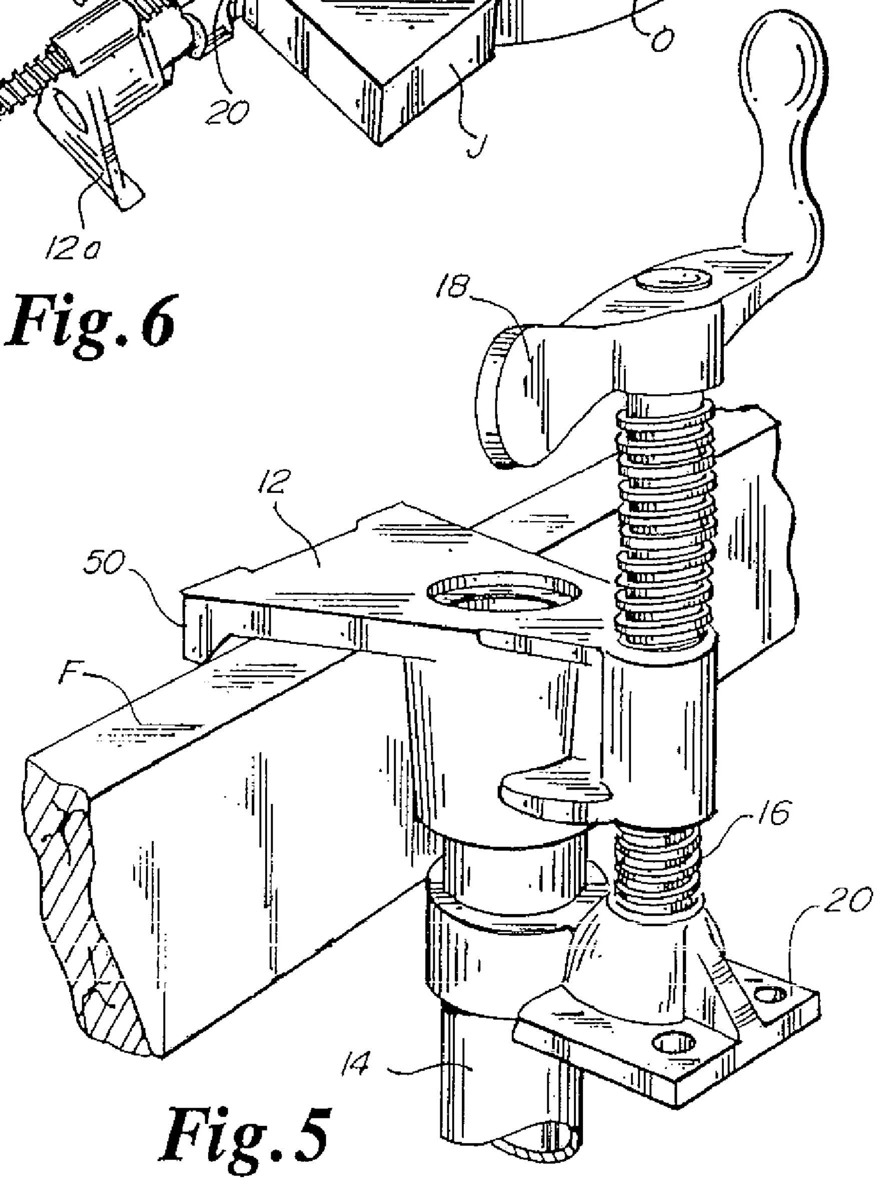
FIG. 5 is a perspective view of the pipe clamp of the present invention, showing the use of the hook for hanging the pipe clamp on a fixture.

As best seen in FIG. 5, one of the supports 12 has a hook portion 50 that can be used to hang the pipe clamp on a fixture F without the use of the clamping faces 20, 24.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A pipe clamp apparatus for clamping objects, the apparatus adapted to rest upon a surface, the apparatus comprising:

(a) a first support having a hook portion allowing the apparatus to be suspended therefrom;

(b) a second support;

(c) an elongated body secured to the first support and slidably engaging the second support;

(d) each of the first support and second support having a base, wherein each base comprises a first portion having a bottom surface and a second portion engaging the elongated body, the first portion of one of the first and second supports being wider than the second portion, and one of the first support and second support having sides tapering substantially continuously from the bottom surface to the elongated body;

(e) a movable clamping member;

(f) a screw threadably engaged to the clamping member and moving the clamping member toward or away from the second support, and (g) a handle attached to the screw at a distance from the base.

2. The apparatus of claim 1, wherein the distance between the handle and the bottom surface of the base is at least about 1¼", thereby allowing a user to effectively grip the handle without interference from the surface.

3. The apparatus of claim 1, further comprising pads on the base with a cut-out therebetween.

4. The apparatus of claim 3, wherein the pads are about one-eighth inch in height.

5. The apparatus of claim 1, further comprising attachment apertures for securing a device to the apparatus.

6. The apparatus of claim 5, wherein the device is a jig.

7. The apparatus of claim 5, wherein the device is a caul.

8. The apparatus of claim 1, wherein one of the first support and second support is substantially triangular.

9. The apparatus of claim 8, wherein one of the first support and second support is substantially an isosceles triangle, with the base forming the non-equal side.

10. A pipe clamp for securing objects, the pipe clamp adapted to rest upon a bench or other surface, the pipe clamp comprising:

(a) a first support;

(b) a second support wherein the one of the supports further comprises a hook portion allowing the pine clamp to be suspended therefrom;

(c) a pipe secured to the first support and slidably engaging the second support;

(d) each of the first support and second support having a base, the base having a bottom surface;

(e) a clamping member;

(f) a screw threadably engaged to the clamping member and moving the clamping member toward or away from the second support and a handle attached to the screw at a distance from the base;

(g) wherein the base comprises a first portion adapted to rest on the surface and a second portion engaging the pipe, the first portion of one of the first and second supports being wider than the second portion and one of the first support and second support having sides tapering substantially continuously from the bottom surface to the pipe.

11. The apparatus of claim 10, wherein the distance between the handle and the bottom surface of the base is at least about 1¼", thereby allowing a user to grip the handle without contacting the surface.

12. The apparatus of claim 10, further comprising pads on the base with a cut-out therebetween.

13. The apparatus of claim 12, wherein the pads are about one-eighth inch in height.

14. The apparatus of claim 10, further comprising attachment apertures for securing a device to the pipe clamp.

15. The apparatus of claim 14, wherein the device is a jig.

16. The apparatus of claim 14, wherein the device is a caul.

17. The apparatus of claim 11, wherein one of the first support and second support is substantially triangular.

18. The apparatus of claim 17, wherein one of the first support and second support is substantially an isosceles triangle, with the base forming the non-equal side.

* * * * *